Patented May 22, 1945

2,376,437

UNITED STATES PATENT OFFICE 2,376,437

LUMINESCENT SCREEN AND METHOD OF MANUFACTURE

Humboldt W. Leverenz, South Orange, N. J., assignor to Radio Corporation of America, a corporation of Delaware No Drawing. Application February 27, 1942, Serial No. 432,655

5 Claims. (Cl. 117—34.1)

My invention relates to improvements in depositing phosphor materials to form luminescent screens and particularly to methods of forming such screens wherein the material is settled through an aqueous medium.

In my U. S. Patent No. 2,108,830 I disclosed a method of settling luminescent material through an aqueous solution of an easily volatilized electrolyte, such as ammonium salts used as settling aids. While I found my previous method satisfactory for settling very small particles of phosphor materials, such as those which would pass through a 400 mesh screen, the methods disclosed in my above patent are not wholly satisfactory for settling screens composed of large particle size phosphor material, such as particles and aggregates of particles of 5 microns in diameter and up to 30 microns in diameter. Thus, the particles of large size do not adhere too well to the screen foundation, inasmuch as the Van der Waal forces are relatively small.

Furthermore, luminescent screens made in accordance with my prior method consisted only of the phosphor material and particularly where such screens were used in cathode ray tubes, the secondary electron emission from the screen was often insufficient. While it has been proposed to improve the secondary emission or electrical conducting properties of the screen by the incorporation of small metal particles either as individually separated particles or metallic coatings on the phosphor particles, such an expedient is difficult to provide and reduces the available luminous output from the phosphor material when used as a luminescent screen.

It is an object of my invention to provide a highly efficient luminescent screen having great adhesion between the particles and to a screen foundation. It is another object to provide a screen having high secondary electron emitting properties when excited by corpuscular energy. It is another object to provide an adherent screen of phosphor crystals coated with optically translucent or transparent films which offer controllable impedance to corpuscular excitation. It is a further object to provide a method of depositing a phosphor material on a supporting foundation whereby the material is more firmly bound to the foundation than heretofore. It is a still further object to provide a method of settling a phosphor material wherein the time and skill required to settle the material is reduced.

In accordance with my invention I have found that the objects thereof may be fulfilled when large particle size phosphor materials such as particles greater than two microns are settled into contact with a screen foundation through an aqueous solution containing certain soluble compounds which are not easily volatilized, the said compounds producing a binding action of the particles and preferably providing a reaction with the foundation to provide greater adhesion of the particles one with another and with the foundation.

These and other objects, features and advantages of my invention will become apparent to those skilled in the art when taken in connection with the following description, the specific scope of my invention being set forth in the appended claims.

More particularly in accordance with my invention I settle a luminescent material having particle sizes preferably greater than two microns through a liquid or aqueous solution of a lithium oxygen compound which will decompose to a composition comprising an oxide of lithium during the processing of the screen. The oxygen compounds found suitable for carrying out the method are the hydroxide, carbonate, chlorate, germanate and acetate of lithium. I have found my method to be equally applicable in the manufacture of substantially all inorganic phosphor material screens wherein the phosphor may comprise a selenide, sulphide, oxide, borate, tungstate, germanate, aluminate, galliate, or silicate of one or more of the metals consisting of zinc, cadmium, beryllium, magnesium, calcium, strontium, titanium, thorium and zirconium.

While it has been suggested that alkali metal compounds deleteriously affect phosphor materials, such as the sulphides and silicates, I have found that there is no perceptible injury to such phosphors with my invention, the lack of such deleterious effects probably being due to the low concentration of the soluble alkali metal compounds which I use and to the short time of exposure of the phosphor material to these compounds. In previous methods, however, such as dusting a phosphor material upon a previously applied binder layer of such compounds or the spraying of phosphor materials with a binder of such compounds, there may be produced the deleterious effects due to the exceedingly high concentration used and the intimate contact between the materials and the compound. Therefore, in accordance with my invention, I settle the phosphor material through a liquid solvent containing the specified alkali metal compounds as a solute where the amount of the solute is less than one per cent by weight of the total solution.

Lithium hydroxide is particularly advantageous and I prefer to use from 0.1 to 10 parts of 1/10 normal lithium hydroxide solution to 100 parts of water as the settling solution. The ratio of the soluble compound to the water depends somewhat on the quantity of phosphor material to be deposited and I therefore prefer to use a concentration of phosphor to total solution of approximately 5 milligrams of phosphor per milliliter of solution. The 1/10 normal lithium hydroxide solution may be made by dissolving lithium hydroxide to the amount of 1.197 grams in 500 milliliters of doubly distilled water. The lithium hydroxide should be well purified and contain less than one-one hundredth per cent of heavy metals such as copper, silver and lead. The desired proportion such as from 0.1 to 10 milliliters of this 1/10 normal solution is then diluted in 100 parts of doubly distilled water to obtain the settling solution. Sufficient finely divided luminescent material to provide the desired screen thickness is added to the settling solution and thoroughly dispersed by shaking the solution containing the phosphor material. The amount of luminescent material in the settling solution is determined by the desired thickness of the screen, this thickness being expressed in milligrams of phosphor material per unit area. I have found a thickness of from 2 to 20 milligrams per square centimeter sufficient for normal cathode ray tube application, the thinner screens being suitable for low velocity electron beam excitation, the thicker screens being suitable for higher velocity beam excitation. The solution carrying the phosphor material in suspension is then introduced into the cathode ray tube envelope, thoroughly agitated to re-suspend the phosphor in the solution, and the envelope is allowed to remain in an undisturbed position for from 15 minutes to several hours depending upon the particle size of the phosphor. The envelope is then tilted to allow the clear liquid to flow off or the liquid may be siphoned from the envelope. During the siphoning the envelope is preferably tilted very gradually and the screen simultaneously dried, such as by passing over it a stream of warm dry air. Following the removal of the clear liquid and the drying of the screen, the screen and its foundation are baked at a temperature, such as 450° C. for one-half hour, sufficient to convert at least part of the soluble alkali metal compound remaining as a residuum with the phosphor material into lithium oxide.

I have found that not only may the clear liquid be removed more rapidly when the material has settled through such a solution, but that following the drying and baking step, the screen is more firmly attached to the foundation and the residual lithium oxide is conducive to high secondary emission so that electrically conducting material mixed with the phosphor or coating the particles is unnecessary for proper tube operation. In addition, it appears that a small quantity of the lithium oxide reacts with the surface layer or layers of the glass foundation to form a siliceous film which firmly binds the screen material to the foundation. Furthermore, I have found that there is no deleterious effect on the phosphor materials, this preferably being due to the low concentration of the soluble compound, it being noted that the maximum concentration within the above limits corresponds to 0.0230 gram of the compound per 100 milliliters of the solution. Since at no time during the process of applying the phosphor material to the foundation does the amount of the soluble compound exceed the exceedingly small amount referred to above, the phosphor material is not deleteriously affected to any noticeable degree. Furthermore, any reaction which occurs between the glass foundation is of such a minor extent that the physical strength of the glass is unaffected to any perceptible degree.

I have found that following the above procedure a second solution of the lithium oxide compound may be used to add to the lithium oxide already formed with the phosphor material without deleteriously affecting the phosphor. Thus it appears that following baking to convert a portion of the lithium compound to the oxide, the lattice strength of the material is greater so that more concentrated solutions of the compound are substantially ineffective in damaging the phosphor material. Thus following the first baking, the phosphor screen may be covered with solutions of the soluble compound to full normalcy followed by removal of the solution and baking. To obtain even heavier layers comprising the lithium oxide the procedure may be repeated with increasingly higher concentrations of the soluble compound. By such use of heavy layers I am able to provide a corpuscular energy barrier action which is particularly useful in combination with cascade phosphor screens such as described in my copending application, Serial No. 383,893, filed March 18, 1941, the heavier alkali metal compounds such as caesium compounds providing greater barrier action than the lighter lithium oxygen compounds.

While I have specifically referred to lithium hydroxide, in describing the details of the method, lithium carbonate, lithium chlorate, lithium germanate or lithium acetate, may be used to equal advantage with the same proportions as given with respect to lithium hydroxide. Thus while I have described my invention with particular reference to the application of phosphor materials to cathode ray screen foundations, it will be appreciated that my invention is likewise applicable to the application of such materials for other uses such as in depositing screens for luminescent lamps or electric discharge devices in general and that I do not wish to be limited to the particular use to which my improved product may be applied or to the specific materials utilized in practicing my invention except as set forth in the appended claims.

I claim:

1. The method of forming a luminescent screen comprising the steps of dispersing a luminescent material in an aqueous solution of lithium hydroxide, allowing said material to settle into contact with a screen foundation, removing all of the solution from said foundation except a residuum held in the settled material and heating said foundation and said material to convert only the lithium hydroxide remaining with said material into a material including an oxide of residuum of said lithium.

2. The method of forming a luminescent screen comprising the steps of settling a finely divided luminescent material through a solution of lithium hydroxide, said solution being from $10^{-2}$ to $10^{-4}$ of normalcy with respect to said lithium hydroxide, interrupting the fall of said material on a screen foundation, removing all but a small residuum of said solution from said foundation, and heating said foundation to convert the solute of said residuum into an oxide of lithium.

3. The method of forming a luminescent screen comprising settling a finely divided phosphor material through a solution containing a lithium oxygen compound selected from the group comprising lithium hydroxide, lithium carbonate, lithium chlorate, lithium germanate and lithium acetate, interrupting the fall of said material on a screen foundation, removing all but a small residuum of said solution, heating said foundation and said residuum to convert a portion of said compound into an alkali metal oxide, applying a second solution of said compound to the phosphor material on said foundation, removing all but a small residuum of said second solution and heating the phosphor material on said foundation to convert said residuum into an alkali metal oxide.

4. The method claimed in claim 3 wherein said second solution has a higher concentration of said compound than the first-mentioned solution.

5. The method of forming a luminescent screen comprising covering a foundation member with a $\frac{1}{100}$ to $\frac{1}{10000}$ normal solution of a lithium compound selected from the group comprising lithium hydroxide, lithium carbonate, lithium chlorate, lithium germanate and lithium acetate, depositing a phosphor material upon said foundation through said solution, removing all but a small residuum of said solution, baking said foundation at a temperature sufficient to crystallize the residuum of said compound, covering said foundation and the deposited phosphor material with a second solution having a greater normalcy of said compound than said first-mentioned solution to increase the amount of compound on said phosphor material without deleteriously affecting said material, removing all but a small residuum of said second solution from said foundation and baking said foundation at said temperature.

HUMBOLDT W. LEVERENZ.